(12) United States Patent
Sun et al.

(10) Patent No.: US 8,036,659 B2
(45) Date of Patent: Oct. 11, 2011

(54) METHOD FOR REQUESTING AN UNREGISTERED UE TO PERFORM REGISTRATION IN THE IMS

(75) Inventors: Chunying Sun, Beijing (CN); Xiaoqiang Li, Beijing (CN)

(73) Assignees: Samsung Electronics Co., Ltd (KR); Beijing Samsung Telecom R&D Center, Beijing (CN)

(*) Notice: Subject to any disclaimer, the term of this patent is extended or adjusted under 35 U.S.C. 154(b) by 1015 days.

(21) Appl. No.: 11/913,155

(22) PCT Filed: May 2, 2006

(86) PCT No.: PCT/KR2006/001652
§ 371 (c)(1),
(2), (4) Date: Oct. 30, 2007

(87) PCT Pub. No.: WO2006/118416
PCT Pub. Date: Nov. 9, 2006

(65) Prior Publication Data
US 2008/0200170 A1    Aug. 21, 2008

(30) Foreign Application Priority Data
Apr. 30, 2005    (CN) .......................... 2005 1 0066900

(51) Int. Cl.
*H04W 4/00*    (2009.01)
(52) U.S. Cl. ............... 455/435.1; 455/432.3; 455/422.1; 455/518; 370/328; 370/338

(58) Field of Classification Search ............... 455/435.1, 455/432.3, 422.1, 518; 370/328, 338
See application file for complete search history.

(56) References Cited

U.S. PATENT DOCUMENTS

| | | |
|---|---|---|
| 2002/0111167 A1 | 8/2002 | Nguyen et al. |
| 2004/0184435 A1 | 9/2004 | Westman |
| 2004/0190498 A1 | 9/2004 | Kallio |
| 2005/0021351 A1* | 1/2005 | Koskinen et al. ................. 705/1 |
| 2005/0083909 A1 | 4/2005 | Kuusinen |

OTHER PUBLICATIONS

PTO/ISA/210 PCT International Search Report (3 pages).
PTO/ISA/237 PCT Written Opinion of the International Searching Authority (4 pages).
Oliver Haase et al., Unified Mobility Manager: Enabling Efficient SIP/UMTS Mobile Network Control, IEEE Wireless Communications, Aug. 2003.

* cited by examiner

*Primary Examiner* — Nghi Ly
(74) *Attorney, Agent, or Firm* — The Farrell Law Firm, P.C.

(57) ABSTRACT

The method for requesting an Internet Multimedia Sub-system (IMS) unregistered User Equipment (UE) to perform IMS registration including initiating an IMS domain session or sending an IMS relevant signaling to a called subscriber by a UE A; informing the UE A information that the called subscriber has not registered with the IMS by the network; requesting the called terminal to conduct IMS registration by the UE A; and restarting the IMS session after the called terminal completes the IMS registration. An IMS unregistered UE can also perform IMS service.

18 Claims, 10 Drawing Sheets

METHOD FOR REQUESTING AN UNREGISTERED UE TO PERFORM REGISTRATION IN THE IMS

PRIORITY

This application is a national stage application of an international application filed in the Korean Intellectual Property Office on May 2, 2006 and assigned PCT Serial No. PCT/KR2006/001652, which claims priority to an application filed with the Chinese Patent Office on Apr. 30, 2005 and assigned Serial No. 200510066900.7, the contents of which are incorporated herein by reference.

BACKGROUND OF THE INVENTION

1. Field of the Invention

The present invention relates to the field of $3^{rd}$ Generation (3G) mobile communication, especially to a registration request that is not initiated by a subscriber in an Internet Multimedia Sub-system.

2. Description of the Related Art

Figure 1:
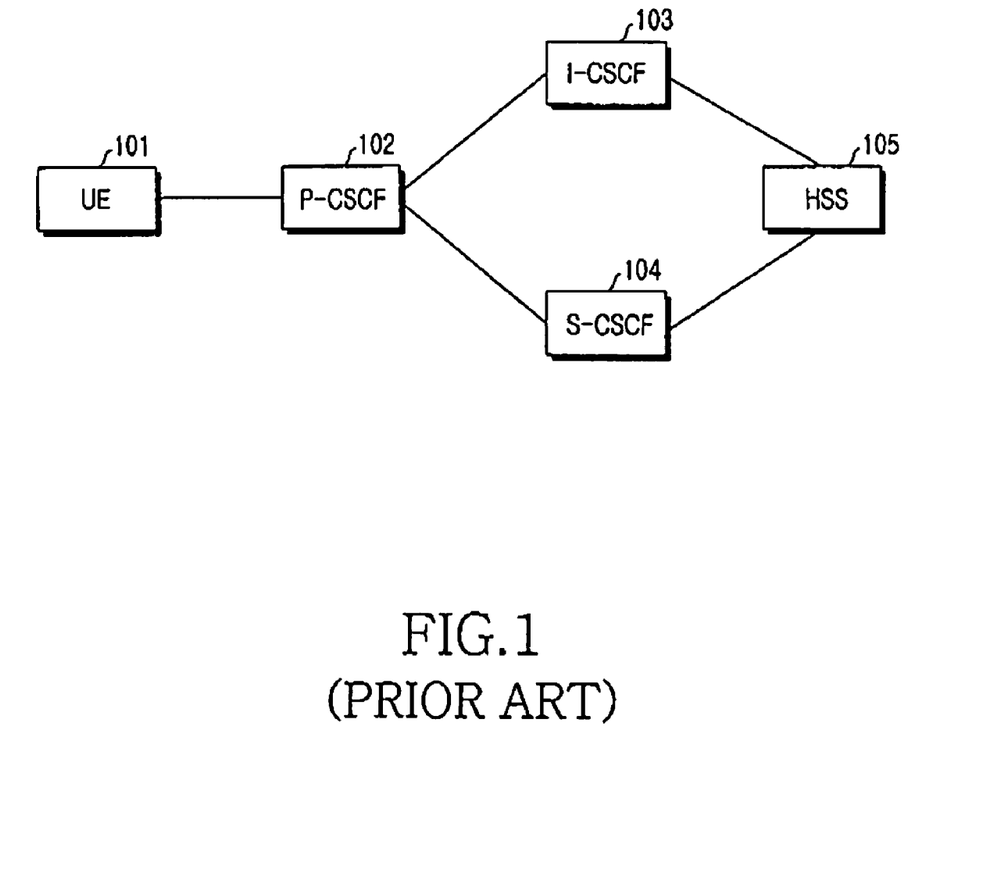
FIG. 1 shows a block diagram of architecture of an IMS.
Figure 9:
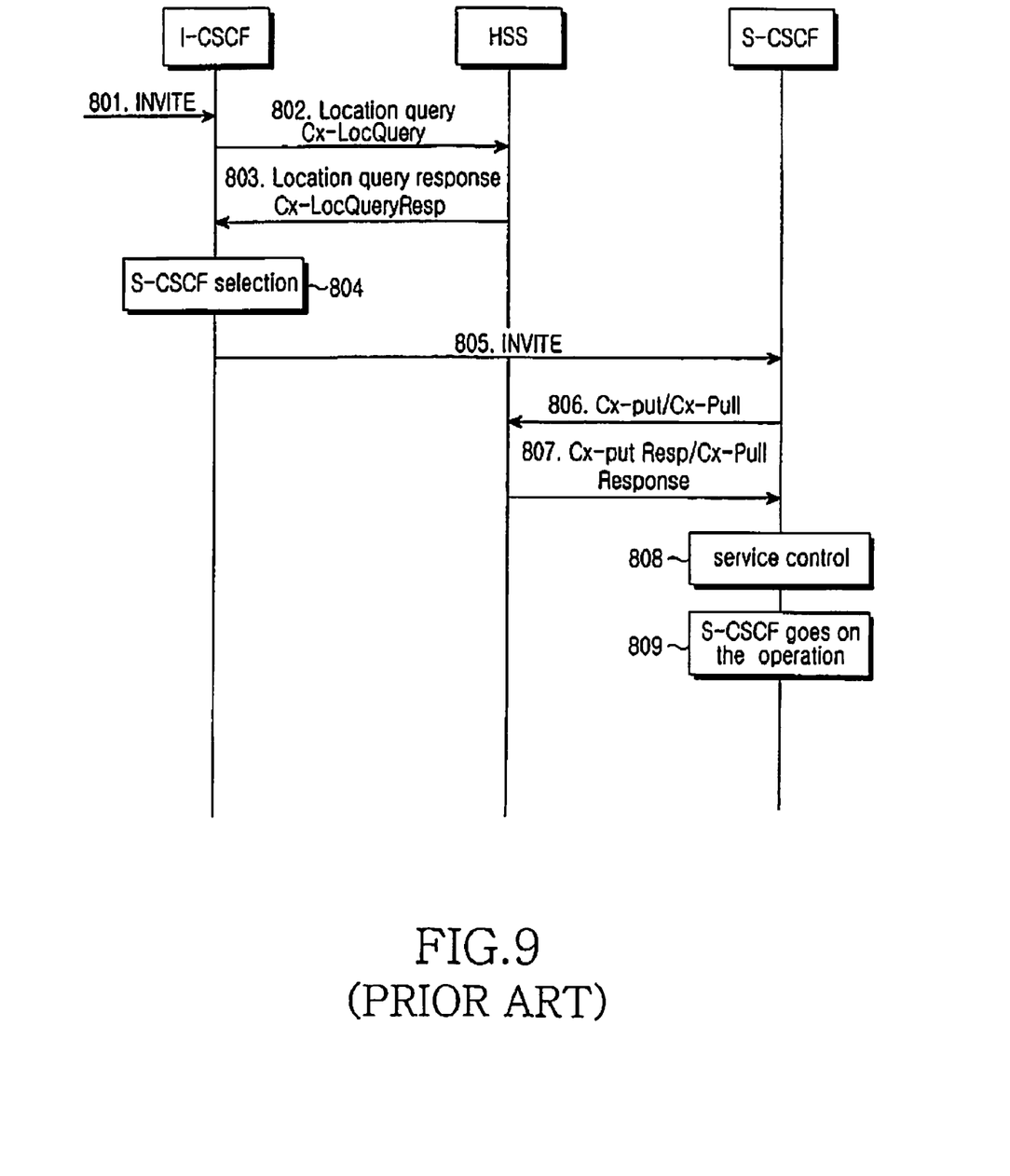
FIG. 9 illustrates a process of detecting IMS registration state.

The Internet Multimedia Sub-system (IMS), as shown in FIG. 1, is a structural framework established by the $3^{rd}$ Generation Partnership Project (3GPP) to provide subscribers with the IMS service. Before using the IMS service, a subscriber (user equipment) 101 must register with a Service Call Session Control Function (S-CSCF) 104 of the IMS, informing an S-CSCF subscriber of a binding relationship between a subscriber's Public User Identification (PUI) and an Internet Protocol (IP) address corresponding to the location of the subscriber. During the process of registration, the subscribers can also inform the network of their characteristics and the support ability and so on. (For more information, please refer to the criterion Technical Specification (TS) 23.228 of the 3GPP). In FIG. 1, a Proxy Call Session Control Function (P-CSCF) 102 serves as a proxy gateway for IMS accessing, which usually is a certain gateway of the network in which the subscriber currently locates. The address of the gateway is detected by the P-CSCF 102 and informed by the network when the subscriber is performing IP access. (For more information on how to implement the above operation, please refer to criterion TS23.228). By parsing a home network name included in the PUI of the subscriber 101, the P-CSCF 102 locates an Inquiry Call Session Control Function (I-CSCF) 103, through which the P-CSCF 102 can interact with a Home network registration Subscriber Server (HSS) 105 to locate the S-CSCF 104 that the subscriber 101 belongs to. After the I-CSCF 103 locates the subscriber's S-CSCF 104, the I-CSCF 103 forwards messages received from the P-CSCF 102 to the S-CSCF 104 to process the messages. If the S-CSCF 104 has not already saved the subscriber's service attribute, the S-CSCF requests the subscriber's service attribute from the HSS 105. Some details on the interaction between the I-CSCF and the HSS and that the interaction between the S-CSCF and the HSS are illustrated in FIG. 9. The S-CSCF proceeds with processing messages received from the subscriber.

FIG. 9 shows a process of a registration state inquiry. In step 801, the I-CSCF receives an INVITE message, which is used to establish a first Session Initiation Protocol (SIP) message initiated by an IMS call. The INVITE message includes a subscriber's SIP Uniform Resource Identifier (URI) or TELephone (TEL) URI. Regardless of which subscriber's PUI is included in this message, the I-CSCF is able to locate the subscriber's HSS according to available criteria. In the HSS, information on some service characteristics and the like agreed upon between the subscriber and the operator is included. In addition, the information on whether the subscriber has registered with the IMS is included in the HSS. In step 802, the I-CSCF sends a (Location Query) Cx-LocQuery message to the HSS, including the subscriber's information on PUI, etc. In 803, the HSS returns the information on whether the subscriber has been registered, which is included in (Location Query Response) Cx-LocQueryResp message, If the subscriber has been registered, the HSS returns the selected S-CSCF information to the HSS. If the subscriber's S-CSCF information or the S-CSCF characteristic information for the subscriber is included in step 803, the I-CSCF selects a certain S-CSCF according to the characteristics of S-CSCF in step 804. In step 805, after the S-CSCF has been selected, the I-CSCF sends the received INVITE message to the S-CSCF. If the S-CSCF is unaware of the subscriber's service attributes, the S-CSCF requests the subscriber's service attribute information from the HSS. In step 806, the S-CSCF sends a Cx-Pull message to the HSS, including a User Equipment's (UE's) PUI, etc. In step 807, the HSS returns the subscriber's service attributes to the S-CSCF. According to the subscriber's service attributes information obtained in the previous step, the S-CSCF conducts a service control in step 808 and then performs a corresponding service operation in step 809.

Figure 8:
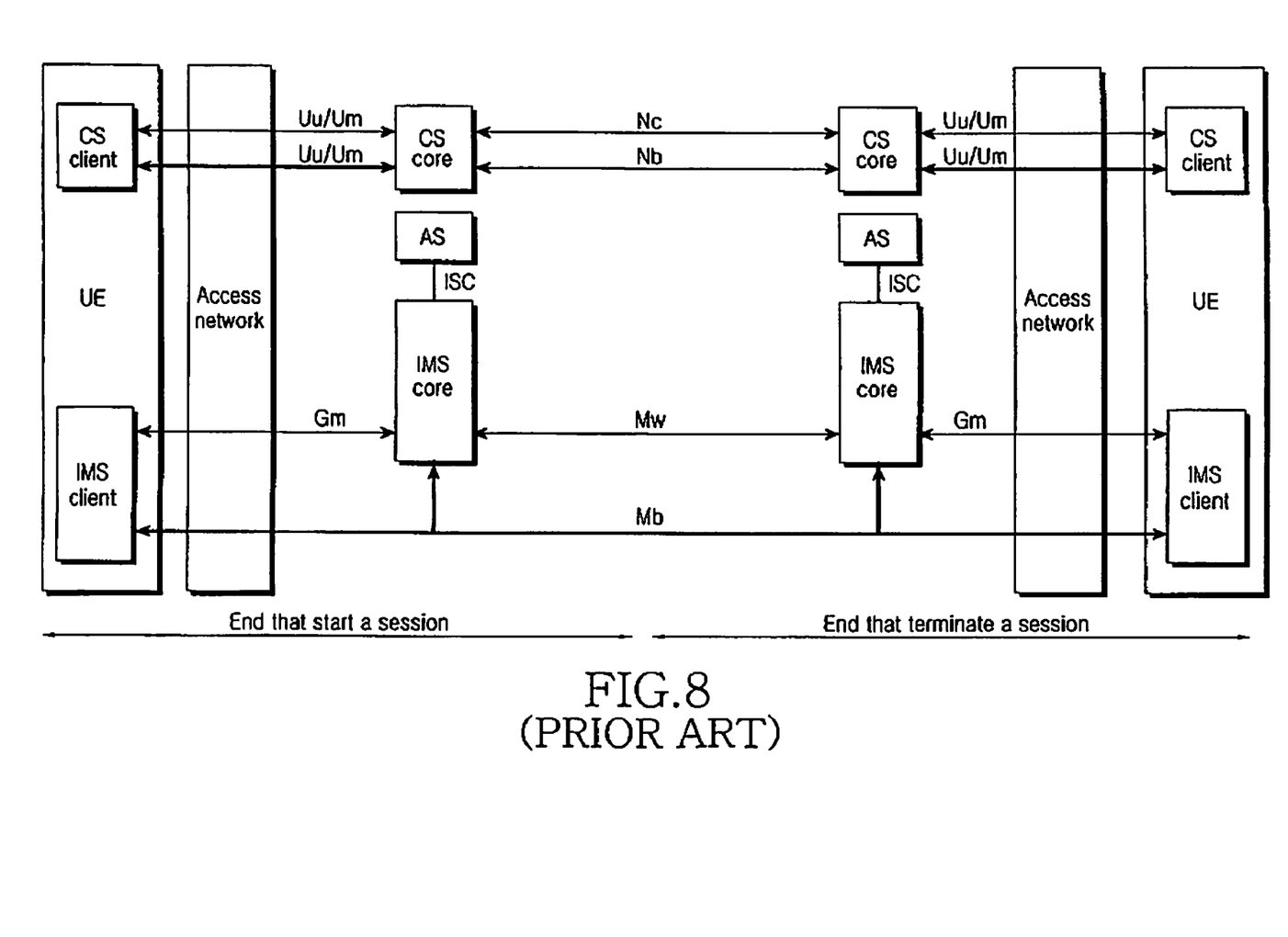
FIG. 8 shows a block diagram of CSI architecture.

On a basis of the IMS, the 3GPP is working on establishing a standard of Combinatorial Circuit Switching domain Call and IMS Session known as a Customer Information Control System (CICS) Socket Interface (CSI), which is also referred to in FIG. 8 for more information.

Two Circuit Switching (CS) and IMS clients are set in a User Equipment (UE), one client for a CS domain call, and the other client for a session of the IMS domain. When the CS domain call and the IMS domain session are conducted simultaneously between the same two UEs, then in the application layer of the UE, the same combinatorial service is presented to the subscriber by at least one Application Server (AS) connected the IMS domain. In this case, some interactions, operations, etc. between the CS domain and the IMS domain should occur.

In FIG. 8, the UEs access a CS domain core of the CS domain and an IMS domain core of the IMS domain through Access networks corresponding to each of the UEs. The CS domain core refers to the network entity related to the CS domain call. In general, the CS domain core may include a Mobile terminal Switching Center (MSC), a Visitor Location Register (VLR), etc. The IMS domain core refers to the network entity related to the IMS domain session. In general, it may include all entities in FIG. 1.

Figure 2:
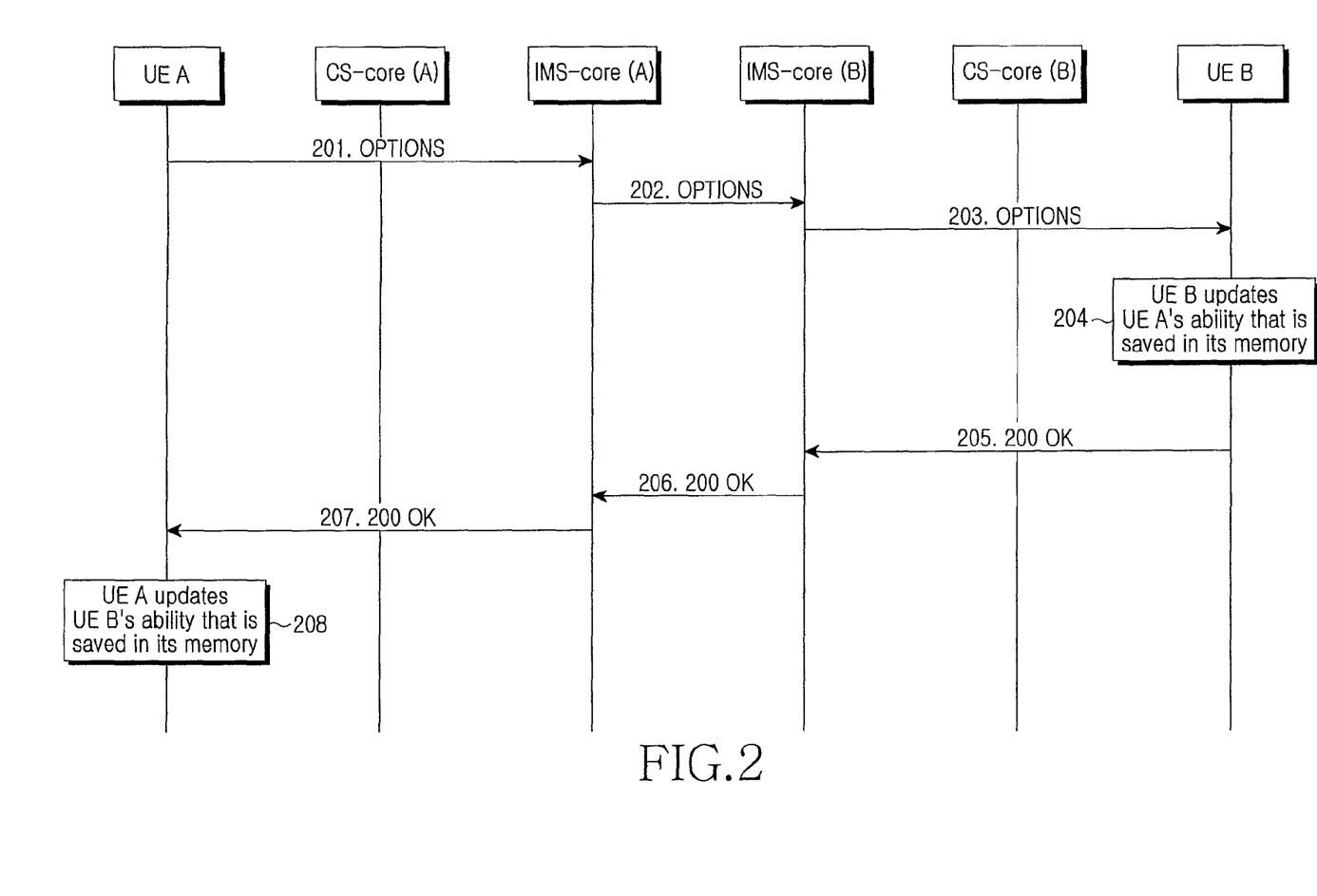
FIG. 2 illustrates a process that a UE exchanges terminal ability in virtue of an OPTIONS message.

Before conducting a CSI service between two UEs, the two UE's must be informed of their abilities in CSI supporting in advance. The ability in CSI supporting is transferred via an OPTIONS message. FIG. 2 illustrates the process of transferring a terminal's CSI supporting ability between two subscribers through the OPTIONS message, which may include parameters such as UE A's MS-Integrated Services Digital Network (ISDN), the SIP URI, the type of media bearer, information regarding whether the CSI is supported, etc. Actually, in steps 201 to 203, UE A sends the OPTIONS message to UE B. The UE A is the mobile terminal currently used by the calling subscriber to initiate the call to the called subscriber; while UE B is the mobile terminal currently used by the called subscriber to receive the call from the calling subscriber. (For details on these parameters, please refer to criterion 3GPP TS 23.279). Then in steps 205 to 207, the UE B sends the 200 OK message to the UE A, which includes the UE B's MS-ISDN, the SIP URI, the type of media bearer, whether the CSI is supported, etc. In this way, the UE A knows about the UE B's terminal ability, and vice versa. In other words, in step 204, the UE B updates the UE A's ability that is saved in the UE B's memory, and in step 208 UE A updates the UE B's ability, which is saved in the UE A's memory. The terminal ability of the counterpart is saved in the terminal of the UE and is monitored and controlled by a certain timer. If timeout of the timer occurs, the timer begins to exchange a new process of terminal ability. In addition the terminal ability of the counterpart saved in the flash memory will be overwritten by a new one.

Figure 3:
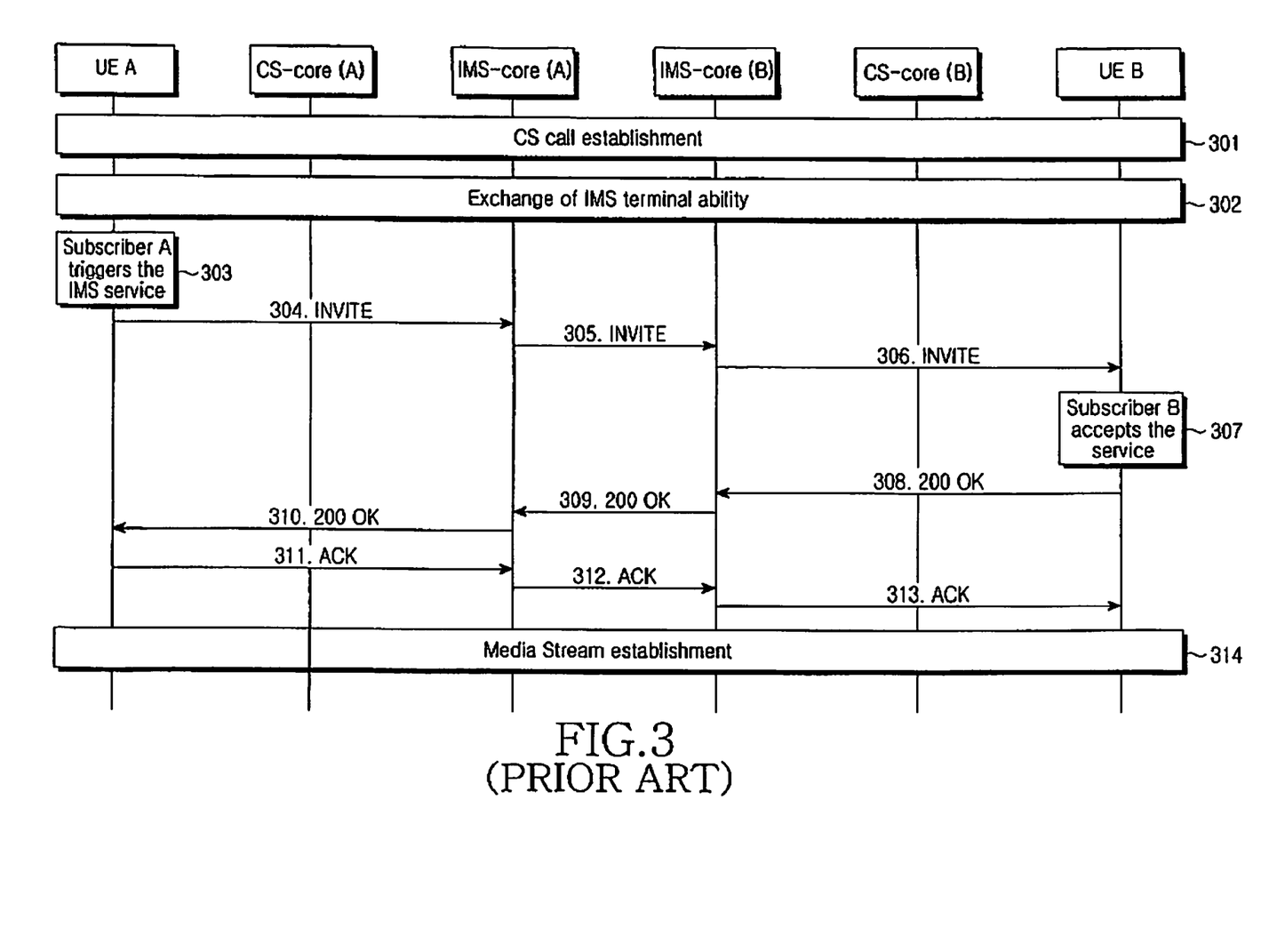
FIG. 3 shows that an IMS session is added between two UEs based in a CS domain call.

If the terminal ability of the counterpart is not saved in the UE A, the Circuit Switching domain call is initiated by the UE A between the UE A and the UE B. As shown in FIG. 3, in step 301, a CS domain call is conventionally established between a subscriber A and a subscriber B, and the communication is performed. In order to conduct the CSI subsequently, the process of terminal ability exchanging is performed between the subscriber A and the subscriber B. Step 302 in FIG. 3, contains all of the steps of FIG. 2. When the OPTIONS message is sent by the subscriber A to the subscriber A's S-CSCF, the message may include the information on the UE B's TEL URI as well as the subscriber A's terminal ability information. After this message is transferred from the UE A's S-CSCF to the IMS core B of the called UE B, the subscriber that has not registered with the IMS is detected, i.e., the IMS core B does not have the subscriber's current IP address. Therefore, communication between the UE A and the UE B cannot occur. Similarly, if the UE A knows the UE B's terminal ability, but the IMS core B detects that the subscriber has not registered with the IMS when the IMS session is being established in steps 303-314, i.e., the IMS core B does not have the subscriber's current IP address, communication between the UE A and the UE B cannot occur.

SUMMARY OF THE INVENTION

Therefore, an object of the present invention is to provide a method for requesting an unregistered User Equipment (UE) to perform registration in the IMS. This method is used for the data service transmission enhancement. In this method, a calling UE A sends a Circuit Switching (CS) message to a called UE B to inform the UE B of a current Internet Multimedia Sub-system (IMS) registration. In this way, a Customer Information Control System (CICS) Socket Interface (CSI) service can be guaranteed between the calling and the called subscribers.

According to one aspect of the present invention, a method for requesting an unregistered UE to perform a registration in an IMS includes a) initiating, by a UE A, an IMS domain session or sending an IMS relevant signaling to a called subscriber;

b) informing the UE A, by a network, information notifying the UE A that the called subscriber has not registered with the IMS by the network;

c) requesting the called terminal, by the UE A, to conduct the IMS registration; and d) after the called terminal completes the IMS registration, restarting the IMS session.

With method according to the present invention, an IMS unregistered UE can also perform the IMS service.

According to another aspect of the present invention, a method for requesting an unregistered UE to perform a registration in an IMS includes a) initiating a CS domain call by a UE A to a called subscriber to request the called subscriber to conduct an IMS registration or inform the called subscriber of the UE A's inclination of the IMS registration;

b) informing the UE A, by the called user, of the called user' inclination of the IMS registration in a response message;

c) determining by the UE A or the called user whether to perform an IMS session and a process of terminal ability switching according to the inclinations of its own and that of a counterpart.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 4:
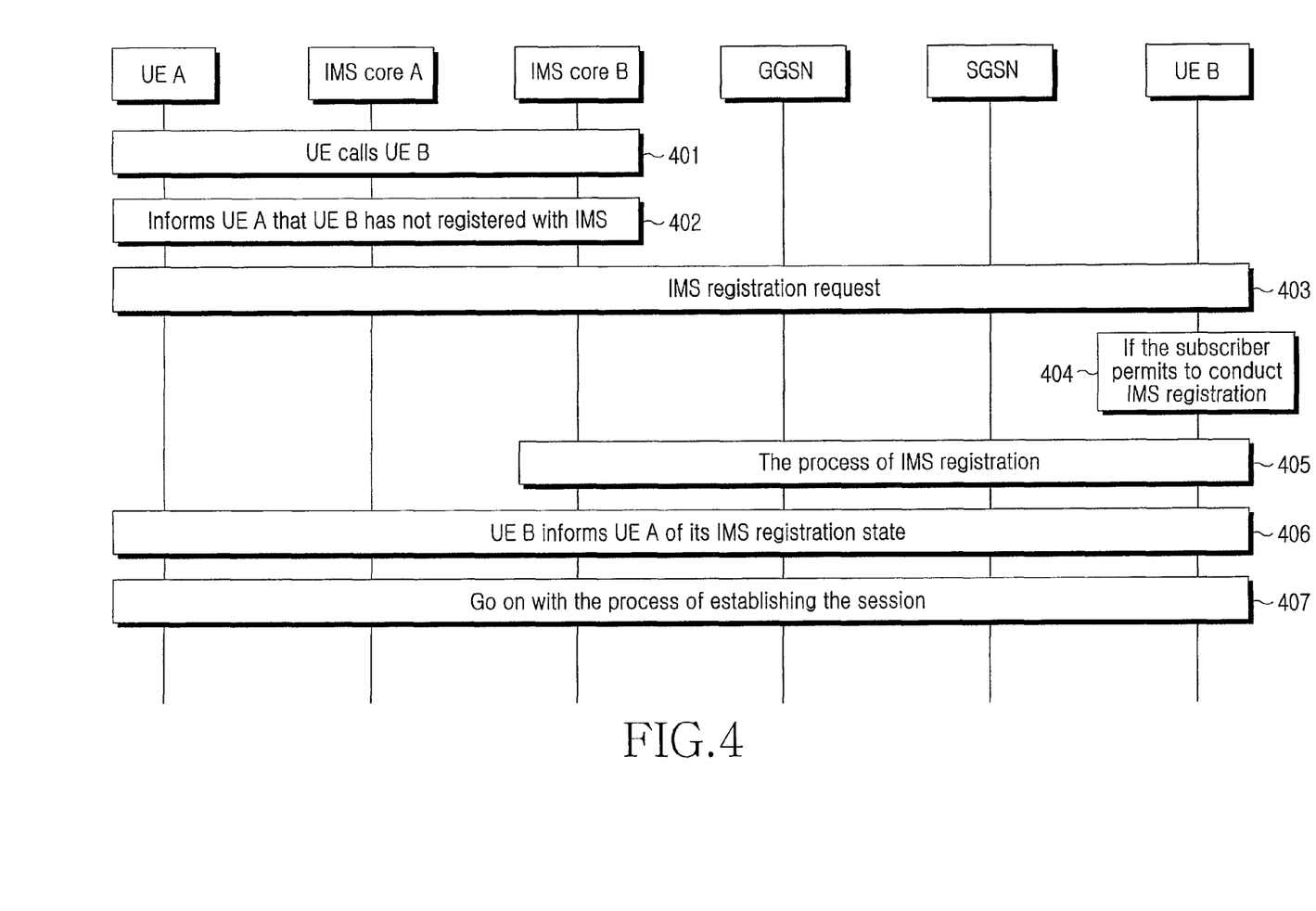
FIG. 4 shows a structure according to the present invention.

FIG. 4 shows a structure according to the present invention. In step 401, by using a UE A, a calling subscriber initiates an IMS domain session or sends an IMS relevant signaling to a UE B owned by a called subscriber. If the network detects that the called subscriber has not been registered to the IMS, the network informs the UE A of the non-registration in step 402 and then the UE A sends an IMS registration request to the called subscriber's UE B in step 403. In step 404, the UE B negotiates with the called subscriber and if the called subscriber determines to conduct the IMS registration, the UE B performs the process of IMS registration in step 405. In step 406, which is optional in the present invention, after the registration procedure completes, the UE B informs the UE A of the IMS registration state. In step 407, then the UE A or an IMS core B restarts a new session or continues with the original call.

Figure 5:
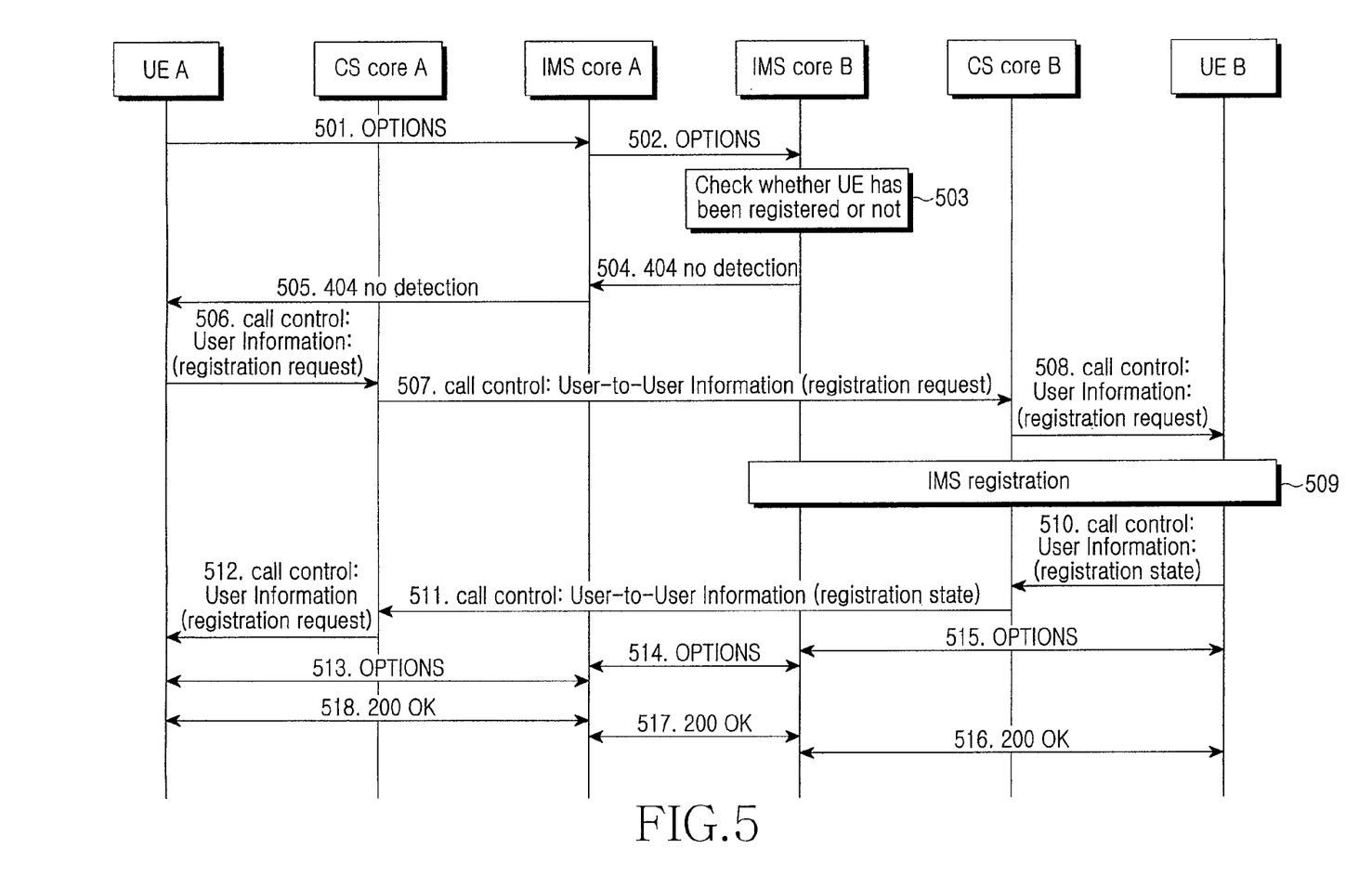
FIG. 5 illustrates a process of initiating an IMS registration request with a call control message when "OPTIONS" is being transferred.

FIG. 5 shows one embodiment of the present invention.

After a CS domain call is established between the UE A and the UE B, it is necessary for the UE A to exchange the terminal ability with the UE B and in step 501, the UE A sends an OPTIONS message to its IMS core A, including parameters such as the UE B's SIP URI, the UE A's Mobile Subscriber Integrated Services Digital Network (MSISDN), SIP URI, the type of media bearer, whether the CSI is supported, etc. After the UE A's IMS core A receives and processes this message, the UE A's IMS core determines the UE B's IMS core entity, which will be an Inquiry CSCF (hereinafter referred to as I-CSCF) in general according to the IMS's routing addressing mode, sends the OPTIONS message to the UE B's IMS core so as to change a routing address in the original message while keeping UE A's terminal ability unchanged in step 502. In step 503, after the UE B's IMS core receives this OPTIONS message, the UE B's IMS core checks whether the UE B has registered with the IMS. More detailed explanations of the above process can be provided when referring to FIG. 9. Once the IMS core B determines that the UE B does not conduct the IMS registration, the IMS core B returns an undetected message 404 to the UE in step 504. This message is routed from the IMS cores A to the UE A in step 505. After the UE A receives this message and determines that the UE B has not registered, the UE A initiates a request to ask the UE B to perform an IMS registration. In step 506, the UE A sends a call control message "USER INFORMATION" to a CS core entity (usually the MSC). This message can either be an old call control message, or a new call control message. In this example, a "USER INFORMATION" message including an IMS registration request information element and other information regulated by available criteria is used. In step 507, the CS core A translates the "USER INFORMATION" message to USR (User-to-User Information) and sends the USR to the UE B's CS core. In step 508, the UE B's CS core forwards this message to the UE B, and after the UE B receives this message, the UE B determines whether the IMS registration request information is included in this message. In step 509, if the UE B permits its subscriber to perform IMS registration process, the registration will be carried out between the UE B and the UE B's IMS core entity. (For a detailed description on the above process, please refer to 3GPP TS 24.228). After the UE B succeeds in the UE B's IMS registration, the UE B either initiates the "OPTIONS" message to exchange terminal ability with the UE A or informs UE A of the UE B's IMS registration state. In step 515, in the former case, the UE B sends the "OPTIONS" message to IMS core B and the "OPTIONS" message is forwarded by the UE B's IMS core B and the UE A's IMS core A in step 514 and finally reaches the UE A in step 513. The UE A may include its terminal ability in a "200 OK" message (which is an acknowledgement message sent in response to the "OPTIONS" message) in step 518, the "200 OK" message is forwarded by the UE A's IMS core A and UE B's IMS core B and finally reaches UE B in steps 517 and 516, and thus the process of terminal ability exchanging has completed. If it is necessary for the UE B to inform the UE A of its IMS registration information, the UE B sends the "USER INFORMATION" message to the CS core B in step 510, which in turn forwards this message to the CS core A in virtue of the User-to-User Information (USR) message, in step 511. Then the CS core A forwards the "USER INFORMATION" message to the UE A, in step 512. This message may include the UE B's IMS registration state information: whether the registration succeeds or fails.

Figure 6:
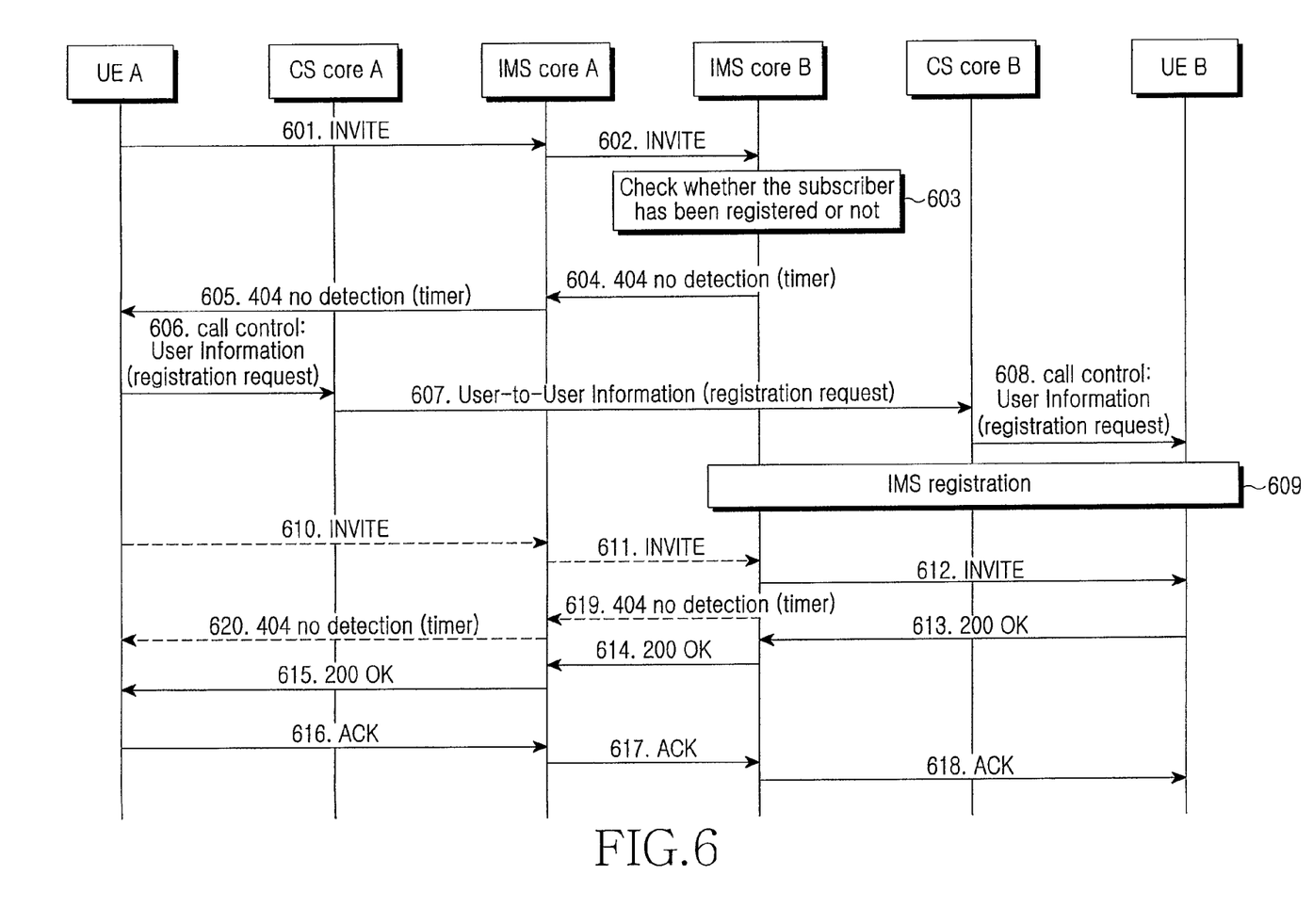
FIG. 6 illustrates a process of initiating an IMS registration request with a call control message when "INVITE" is being transferred.

FIG. 6 describes another embodiment of the present invention.

In this case, a CS domain call has already been established between the UE A and the UE B, and, the UE B's terminal ability has already been saved in the UE A. Therefore, once the UE A requires an addition of a new IMS session, the UE A sends an "INVITE" message to the IMS core A, in step 601, which in turn forwards this message to the IMS core B after processes such as routing addressing, etc. are performed, in step 602. With the method illustrated in FIG. 9, the IMS core B may check whether the UE B has performed any IMS registration, in step 60). In this example, it is assumed that the UE B has not registered with IMS. The IMS core B sends a message (404 no detection message) indicating that no IMS registration has been detected by the IMS core B, in step 604. This message also includes a time length of a timer. The timer indicates that once a timeout occurs, the UE A will re-initiates the IMS call, i.e., the "INVITE" message shown in step 610 in FIG. 6. If no timer is included in the message, an IMS call will not be initiated by the UE A to the network and the remaining steps of the call process will be performed by the network. After the UE A receives the 404 message that no IMS registration has been detected, in step 605, the UE A may request the UE B to carry out the operation of the IMS registration, and send the "USER INFORMATION" message to the CS core A, in step 606, including the information element of IMS registration request. The CS core A encapsulates the "USER INFORMATION" message in the form of a USR message and sends the USR message to the CS core B, in step 607. The USR message also includes the information element of IMS registration request. The CS core B re-encapsulates the content of this message and sends it in the form of the USER INFORMATION message to the UE B (step 608). This message may include the information element of IMS registration request. After the UE B receives this "USER INFORMATION" message, and determines that the calling subscriber requests UE B to register with the IMS and the UE B negotiates with its subscriber. If the subscriber permits the UE B to conduct an IMS registration, the IMS registration will be carried out between the UE B and the IMS core B, in step 609. This registration process is not essential to the present invention, and 3GPP TS 24.228 explains this process in further detail. After the IMS core B finds out that the UE B has been successfully registered, if no timer, in steps 604 and 605 is included in the message (which is sent from the IMS core B to the UE A 404) that no IMS registration has been detected, it is necessary for the IMS core B to send the "INVITE" message to the UE B, step 612, and to continue the process of establishing the IMS session initiated by the UE A. Otherwise, in step 610, the UE A sends the "INVITE" message to the IMS core B again, once timeout to the UE A occurs. After the IMS core B receives the "INVITE" message, in step 611, the IMS core B forwards the "INVITE" message to the UE B, step 612, to carry out the calling process. The UE B accepts this call by feeding back the "200 OK" message, from steps 613 to 615. After the UE A receives the feedback "200 OK" message, the UE A sends an ACKnowledgement (ACK) to the UE B, from steps 616 to 618. Thus, the process of establishing the IMS session completes.

In this example, if the UE B will not perform the IMS registration, when the UE A initiates another call, steps 610 and 611, the UE A no longer requests an establishment of the IMS session even if the timer is not included in the received 404 message that no IMS registration has been detected (steps 619 and 620). However, once the IMS core B determines out that the UE B has not performed a registration within a certain period, the UE B abandons this IMS session.

Figure 7:
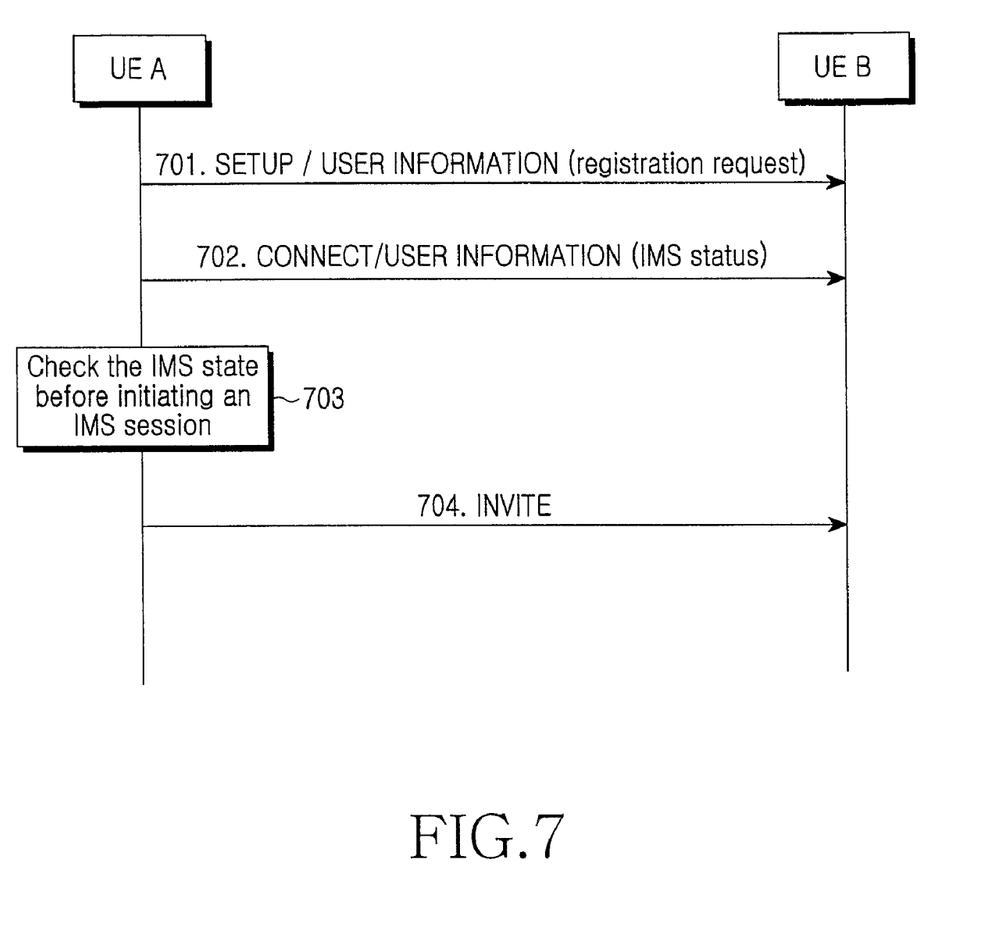
FIG. 7 illustrates a process of initiating an IMS registration request with a call control message when the call is being established.

FIG. 7 describes a third embodiment of the present invention.

Actually, two cases are included in this embodiment. In the first case, when a CS domain call is being established between the UE A and the UE B, a "SETUP" message sent from the UE A to the UE A's CS core may include IMS registration request (step 701). The UE A sending this IMS registration request means that the UE A has performed the IMS registration. Otherwise, no IMS registration request is included in the "SETUP" message. The "SETUP" message is forwarded to the UE B through the UE A's CS core and the UE B's CS core. Herein, a message transferred by the UE A's CS core and the UE B's core CS is named as IAM. After the UE B receives the IMS registration request, the UE B negotiates with the UE B's subscriber to determine whether to perform an IMS registration, in step 703. If necessary, the information that the UE B should perform an IMS registration is indicated by an identifier included in the returned IMS state of a "CONNECT" message, in step 702. The "CONNECT" message may also be an "ALERTING" message. In general, since the IMS registration has not already begun when the message is being transmitted, the IMS registration state only indicates that the UE B is willing to perform the IMS registration. This information is transferred to the UE A's CS domain network by a message ANM or ACM between networks, and finally to the UE A by an "ALERTING" or a "CONNECT" message. After the UE A receives the IMS state, the UE A will reference this information in the UE A's subsequent IMS calls or processes of terminal ability switching. Similarly, because the UE B has received the IMS registration request, the UE B is aware that the UE A has been in the state of IMS registration. This information can be a reference for subsequent IMS calls or the process of terminal ability switching. Only when the IMS registration processes have been performed by oneself and a counterpart of oneself, the IMS call or the process of terminal ability switching may be carried out, in step 704, as shown in FIG. 6 and FIG. 5.

However, when the UE A decides to exchange a terminal ability with the UE B or to initiate an IMS session after the CS domain call has been already established between the UE A and the UE B, the UE A may check the UE B's IMS registration state after communicating with the UE B, or after it receives 404 message that no IMS registration has been detected, as shown in step 604 in FIG. 6 or in step 504 in FIG. 5. Regardless of which case applies, the messages are just the same. The UE A sends the "USER INFORMATION" message to the CS core A to check the UE A's IMS registration state, in step 701. Then the CS core A translates the message into the User-to-User (USR) and sends the USR to the UE B's CS core. In addition, the CS core B translates the USR into the USER INFORMATION and sends the USER INFORMATION to the UE B. However, the UE B sends the IMS state to the UE A also in virtue of the USER INFORMATION.

In this embodiment, the parameter included in the CS message is allowed to be a non-IMS registration request, and by the CS message that the UE A sends to the UE B to request it to perform the IMS registration, the UE A may inform the UE B of the UE A's inclination of the IMS registration. For example, if the UE A has performed the IMS registration or is going to perform IMS registration, the CS message sent to the UE B may contain the UE A's state information on IMS registration, which indicates that the UE A has performed the IMS registration or is going to perform the IMS registration. If the UE A will not perform the IMS registration, the state information on IMS registration included in the CS message indicates that the UE A would not perform the process of IMS registration. If the UE A is going to perform the process of IMS registration, the registration process may be performed within a finite time period right after the message is transmitted, or may be performed before the message is transmitted. After the UE B receives the state information on the IMS registration included in the message, the UE B saves the state information and sends back a response message, such as an "ALERTING" or a "CONNECT" message, informing the UE A of UE B's inclination of IMS registration. This information indicates that the UE B has performed the IMS registration or is going to perform the IMS registration, or would not conduct the process of IMS registration. If the UE B is going to conduct the process of IMS registration, this process may be performed within a finite time period right after the message is transmitted or may be performed before the message is transmitted. In the case that the IMS registration processes have been done by both the UE A and the UE B, the IMS call or the process of terminal ability switching can be carried out (as shown in FIG. 6 and FIG. 5). If either of the two sides will not perform an IMS registration, neither of the UE A nor the UE B can initiate the IMS call or conduct the process of terminal ability switching.

If the information on the inclination of the IMS registration is included in the CS control message (e.g., a "SETUP", an "ALERTING", or a "CONNECT" message), the parameter that can take this information may be the information element "User-User" in these messages.

The User-User protocol identifier in the User-User information element may represent a state of IMS registration with "0" indicating that having the inclination of IMS registration, while "1" indicating that having no inclination of IMS registration. Detailed encoding approaches can be different from each other.

All messages mentioned above are for the convenience of illustration, and it is possible to define new messages for the analysis.

Figure 10:
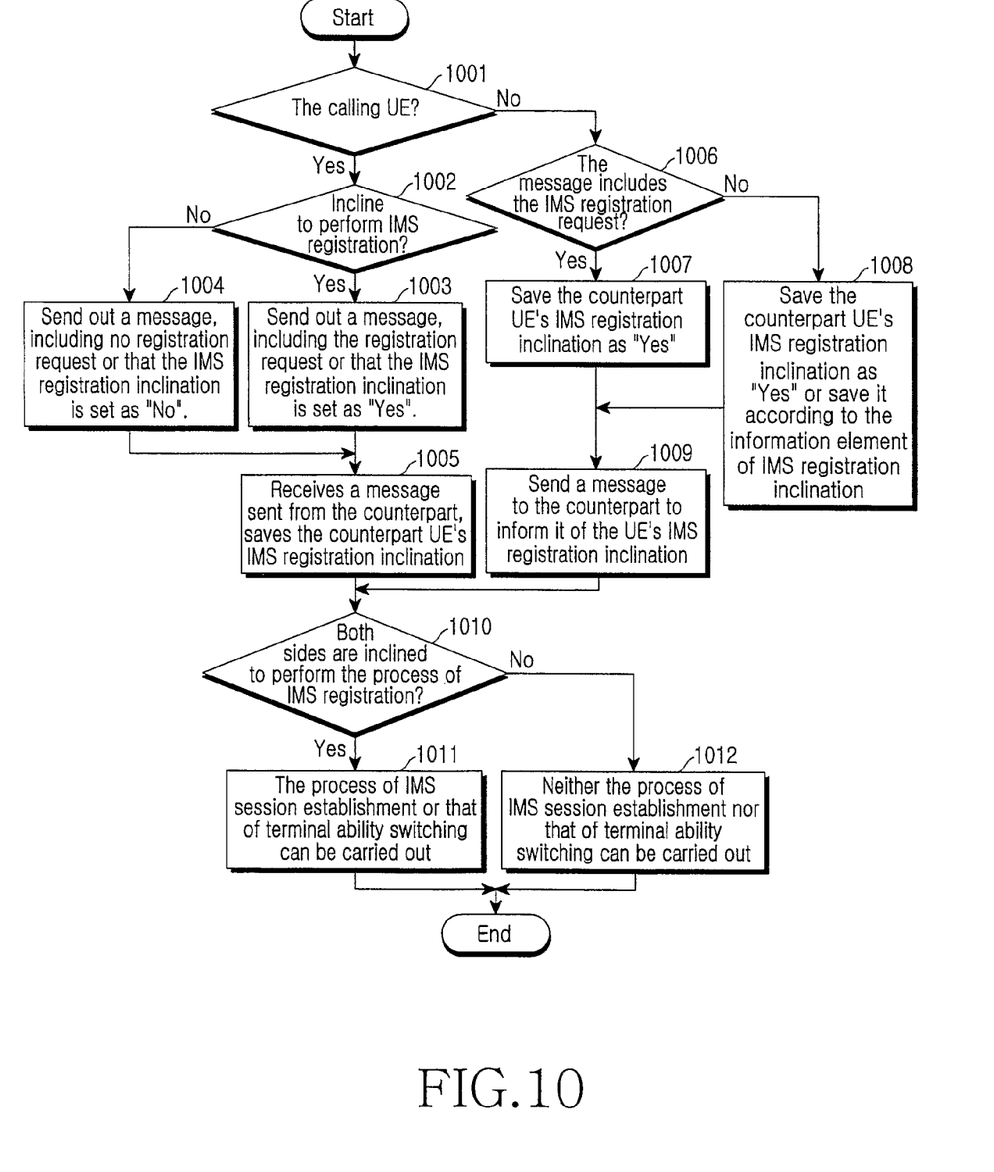
FIG. 10 illustrates an operation of a UE according to a third embodiment of the present invention.

FIG. 10 illustrates the operation of a UE in the third embodiment based on FIG. 7.

First, in step 1001, it is determined whether an operation is performed by the calling subscriber or by the called subscriber. If the operation is performed by the calling subscriber, in step 1002, it is checked whether the user has been registered or is willing to conduct the IMS registration. If the user has been registered or is willing to conduct the IMS registration, in step 1003, the message send by the calling subscriber to the called subscriber includes the registration request information element or the inclination of IMS registration is set as "Yes". Otherwise, in step 1004, the message sent by the calling subscriber to the called subscriber does not contain any registration request information element or the inclination of IMS registration is set as "No". In step 1005, after the calling subscriber receives the message sent from the called subscriber, the calling subscriber saves the counterpart UE's inclination of IMS registration according to the information included in the message. If the above operation is performed by the called subscriber, in step 1006, whether the received message contain information element of the IMS registration request or not is checked. If yes, in step 1007, the counterpart UE's inclination of IMS registration is saved as "Yes". If the message contains no information element of IMS registration request or inclination, the counterpart UE's inclination of IMS registration is saved as "No". In step 1008, if the message contains the information element of an IMS registration inclination, the counterpart UE's inclination of IMS registration is saved as "Yes". In step 1009, the called UE sends a message to the calling UE to inform the calling UE whether the called UE's IMS registration inclination is set as "Yes" or "No". Regardless of which side initiates the IMS session establishment process or the terminal ability switching process, it is necessary to determine whether both sides have the inclination of IMS registration, in step 1010. If both sides have the inclination of IMS registration, in step 1011, the subsequent process of IMS session establishment or the process of terminal ability switching may be carried out; otherwise, in step 1012, neither the subsequent process of IMS session establishment nor the process of terminal ability switching can be carried out.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for requesting an unregistered User Element (UE) to perform a registration in an Internet Multimedia Sub-system (IMS) comprising the steps of:
    a) initiating, by a UE A, an IMS domain session or sending IMS relevant signaling to a called subscriber;
    b) informing the UE A, by a network, information notifying the UE A that the called subscriber has not registered with the IMS;
    c) requesting a called subscriber, by the UE A, to conduct the IMS registration; and
    d) after the called subscriber completes the IMS registration, restarting the IMS session.

2. The method according to claim 1, further comprising:
    after a UE B succeeds in an IMS registration, informing the UE A of the UE B's IMS registration state.

3. The method according to claim 1, wherein the IMS relevant signaling used by the UE A is an "OPTIONS" message for exchanging a terminal ability.

4. The method according to claim 3, wherein the "OPTIONS" message includes a UE B's Session Initiation Protocol (SIP) Uniform Resource Identifier (URI), a UE A's Mobile Subscriber Integrated Services Digital Network (MSISDN) and SIP URI, a type of media bearer, and whether a Customer Information Control System (CICS) Socket Interface (CSI) is supported or not.

5. The method according to claim 1, wherein step c) further comprises:
    sending, by the UE B, a call control message to a Circuit Switching (CS) core entity;
    sending, by a UE A's CS core, a call control message User-to-User Information (USR) to a UE B's CS core; and
    forwarding, by the UE B's CS core, the call control message to the UE B.

6. The method according to claim 1, wherein the UE A uses an "INVITE" message to initiate the IMS domain session to the called subscriber.

7. The method according to claim 5, wherein said call control messages are "USER INFORMATION" or User-to-User Information (USR).

8. The method according to claim 5, wherein said call control messages are new information defined between a subscriber and a network, or between networks.

9. The method according to claim 1, wherein the network informs the UE A to restart an original IMS domain session or a latency for sending the IMS relevant signaling.

10. The method according to claim 1, wherein step d) further comprises:
    informing the UE A of a called subscriber's registration state after the registration is completed, regardless of whether the registration process succeeds.

11. A method requesting an unregistered User Element (UE) to perform a registration in an Internet Multimedia Sub-system (IMS) comprising the steps of:
    a) initiating a Circuit Switching (CS) domain call by a UE A to a called subscriber to request the called subscriber to conduct an IMS registration or inform a called subscriber of a UE A's IMS registration request status;
    b) informing the UE A, by the called subscriber, of the called subscriber's IMS registration request status by a call control message;
    c) determining by the UE A or the called subscriber whether to perform an IMS session and a process of terminal ability switching, according to the requests of the UE A or the called subscriber, respectively, and that of a counterpart.

12. The method according to claim 11, wherein the IMS registration request status of the UE means that the UE has been registered, is going to perform the IMS registration, or would not perform any IMS registration.

13. The method according to claim 11, wherein step c) further comprises, if both the IMS registration request status of the UE A and the IMS registration request status of the called subscriber are that the UE has been registered or is going to perform the IMS registration, either of the UE A and the called subscriber can initiate an IMS session and a process of terminal ability switching.

14. The method according to claim 11, wherein step c) further comprises, if either the UE A or the called subscriber is not inclined to perform the IMS registration, neither the UE A nor the called subscriber can initiate an IMS session and a process of terminal ability switching.

15. The method according to claim 11, wherein a call control message is a "USER INFORMATION" message or a User-to-User Information (USR) message.

16. The method according to claim 11, wherein a call control message is a "SETUP" message, an "ALTERTING" message, or a "CONNECT" message.

17. The method according to claim 11, wherein the message between the UE A and the called subscriber is an Initial Address Message (IAM), an Address Complete Message (ACM), or an ANswer Message (ANM).

18. The method according to claim 11, wherein a call control message is new information defined between the subscriber and a network, or between one network and another network.

* * * * *